United States Patent
Calder et al.

(10) Patent No.: US 11,149,686 B2
(45) Date of Patent: *Oct. 19, 2021

(54) THRUST REVERSER ASSEMBLY

(71) Applicant: MRA Systems, LLC, Baltimore, MD (US)

(72) Inventors: David Patrick Calder, Baltimore, MD (US); Graham Frank Howarth, Middletown, DE (US); Andrew Michael Roach, Aberdeen, MD (US); Timothy Robert Beasman, Baldwin, MD (US)

(73) Assignee: MRA SYSTEMS, LLC, Baltimore, MD (US)

( * ) Notice: Subject to any disclaimer, the term of this patent is extended or adjusted under 35 U.S.C. 154(b) by 635 days.

This patent is subject to a terminal disclaimer.

(21) Appl. No.: 16/363,157

(22) Filed: Mar. 25, 2019

(65) Prior Publication Data
US 2020/0025136 A1      Jan. 23, 2020

Related U.S. Application Data

(63) Continuation of application No. 15/148,472, filed on May 6, 2016, now Pat. No. 10,267,262.

(51) Int. Cl.
*F02K 1/70* (2006.01)
*F02K 1/76* (2006.01)
*F02K 3/06* (2006.01)

(52) U.S. Cl.
CPC ............... *F02K 1/70* (2013.01); *F02K 1/763* (2013.01); *F02K 3/06* (2013.01);
(Continued)

(58) Field of Classification Search
CPC .................................. F02K 1/70; F02K 1/763
See application file for complete search history.

(56) References Cited

U.S. PATENT DOCUMENTS 3,248,878 A     5/1966   Clark
3,612,401 A *  10/1971  Ellis .......................... F02K 1/70
                                                                      239/265.29
(Continued)

FOREIGN PATENT DOCUMENTS

CN      101213361 A      7/2008
CN      103492696 A      1/2014
(Continued)

OTHER PUBLICATIONS

Office Action dated Sep. 25, 2020, in corresponding European patent Application No. 17757581.8, 5 pages.
(Continued)

*Primary Examiner* — Andrew H Nguyen
(74) *Attorney, Agent, or Firm* — Xsensus LLP

(57) ABSTRACT

A thrust reverser assembly for a gas turbine engine including a core engine, a nacelle surrounding at least a portion of the core engine defining a bypass duct between the nacelle and the core engine where an outer door movable between a stowed position and a deployed position extends outwards from the nacelle and a blocker door movable between a stowed position and a deployed position extends into an airflow conduit defined by the bypass duct to deflect air outwards.

20 Claims, 5 Drawing Sheets

(52) U.S. Cl.
CPC .. *F05D 2220/327* (2013.01); *F05D 2260/904* (2013.01); *Y02T 50/60* (2013.01)

(56) References Cited

U.S. PATENT DOCUMENTS

| | | | |
|---|---|---|---|
| 3,684,183 A | 8/1972 | Baerresen | |
| 3,684,186 A | 8/1972 | Baerresen | |
| 4,073,440 A * | 2/1978 | Hapke | F02K 1/74 239/265.29 |
| 5,782,434 A * | 7/1998 | Jean | F02K 1/70 239/265.29 |
| 5,819,528 A | 10/1998 | Masson | |
| 5,983,625 A | 11/1999 | Gonidec et al. | |
| 6,065,285 A | 5/2000 | Gonidec et al. | |
| 6,094,908 A | 8/2000 | Baudu et al. | |
| 6,260,799 B1 | 7/2001 | Russ | |
| 6,976,352 B2 | 12/2005 | Lair | |
| 7,784,735 B2 | 8/2010 | Marche | |
| 8,162,257 B2 | 4/2012 | Teulou | |
| 8,720,818 B1 | 5/2014 | Teulou et al. | |
| 8,959,889 B2 | 2/2015 | Howe | |
| 9,038,367 B2 | 5/2015 | Suciu et al. | |
| 9,181,898 B2 | 11/2015 | Bhatt | |
| 2009/0193789 A1* | 8/2009 | Pero | F02K 1/70 60/226.2 |
| 2010/0072324 A1 | 3/2010 | Teulou | |
| 2013/0067884 A1 | 3/2013 | Bhatt | |
| 2013/0312387 A1 | 11/2013 | West et al. | |
| 2015/0000305 A1 | 1/2015 | Jasklowski | |
| 2016/0025038 A1 | 1/2016 | Sawyers-Abbott | |
| 2017/0107944 A1 | 4/2017 | Kawai et al. | |

FOREIGN PATENT DOCUMENTS

| | | |
|---|---|---|
| DE | 69704443 T2 | 11/2001 |
| EP | 2573375 B1 | 12/2017 |
| JP | 1-136898 A | 5/1989 |
| JP | 7-208263 A | 8/1995 |
| JP | H09228891 A | 9/1997 |
| WO | 2015069350 A2 | 5/2015 |

OTHER PUBLICATIONS

Japanese Office Action dated Jun. 1, 2020, issued in corresponding Japanese Patent Application No. 2018-558141.
Office Action dated Aug. 12, 2020 in Chinese Patent Application No. 201780027860.6, 15 pages.
Canadian Intellectual Property Office, Office Action re Application No. 3,022,985, dated Oct. 3, 2019, 3 pages, Gatineau, Quebec.
Japanese Patent Office, Office Action re Japanese Patent Application No. 2018-558141, dated Oct. 8, 2019, 6 pages, Japan.

* cited by examiner

THRUST REVERSER ASSEMBLY

CROSS REFERENCE TO RELATED APPLICATION

The present application is a continuation of U.S. patent application Ser. No. 15/148,472, filed May 6, 2016, and now allowed, which is incorporated herein by reference in its entirety.

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Thrust reverser assemblies are used within turbine engines to provide a reverse thrust, for example, for deceleration. Reverse thrust is typically achieved by deploying a door assembly into a bypass duct which diverts air from an aft direction to forward direction. The door assembly is deployed with an actuation assembly by axially moving an outer cowl or sleeve to release the door into the bypass duct.

Traditionally the outer door is part of a translating cowl requiring a separate actuator assembly which can add weight and take up valuable space within the nacelle. Thus, there is a need for a blocker door implementation which uses a smaller actuation system and reduces weight added to the nacelle and propulsion system.

BRIEF DESCRIPTION OF THE INVENTION

In one aspect of the present disclosure, a gas turbine engine, comprising a core engine, a nacelle surrounding at least a portion of the core engine, a bypass duct defined by and between the nacelle and the core engine and defining a fore-to-aft airflow conduit, an outer door movable between a stowed position and a deployed position, where the outer door extends outwards from the nacelle, a blocker door extending between a fore end and an aft end and movable between a stowed position and a deployed position, where the blocker door extends into the airflow conduit to deflect airflow outwards, and a rotary actuator assembly located aft of the fore end of the blocker door and rotatable about a hinge point having a circumferential axis with respect to the core engine, operably coupled to the outer door and transferring a torque to the outer door to rotate the outer door about the hinge point between the stowed and deployed positions and operably coupled to the blocker door and transferring a torque to the blocker door to rotate the blocker door about the hinge point between the stowed and deployed positions.

According to a second aspect of the present disclosure, a thrust reverser assembly for a gas turbine engine including a core engine, a nacelle surrounding at least a portion of the core engine to define a bypass duct between the nacelle and the core engine, the thrust reverser assembly comprising an outer door movable between a stowed position and a deployed position, where the outer door extends outwards from the nacelle, a blocker door extending between a fore end and an aft end and movable between a stowed position and a deployed position, where the blocker door extends into an airflow conduit defined by the bypass duct to deflect air outwards, and a rotary actuator assembly located aft of the fore end of the blocker door and rotatable about a hinge point having a circumferential axis with respect to the core engine, operably coupled to the outer door and transferring a torque to the outer door about the hinge point between the stowed and deployed positions and operably coupled to the blocker door and transferring a torque to the blocker door to rotate the blocker door about the hinge point between the stowed and deployed positions.

According to a third aspect of present disclosure, a method of operating a thrust reverser system for an aircraft, the thrust reverser system including an outer and blocker door, the method comprising deploying, by a rotary actuator rotatable at a hinge point about a circumferential axis with respect to a core engine of the aircraft and located aft of a fore end of a blocker door, the outer door from a stowed position to a deployed position, where the rotary actuator transfers a torque to rotate the outer door at the hinge point outwards from a nacelle of a gas turbine engine of the aircraft, and deploying, by the rotary actuator, the blocker door from a stowed position to a deployed position, where the rotary actuator transfers a torque to rotate the blocker door at the hinge point into an airflow conduit defined by a bypass duct defined by and between the nacelle and the core engine, wherein the blocker door and outer door redirect fan duct airflow causing the airflow to exit out and forward as guided by the deployed outer door.

DETAILED DESCRIPTION OF THE INVENTION

Figure 1:
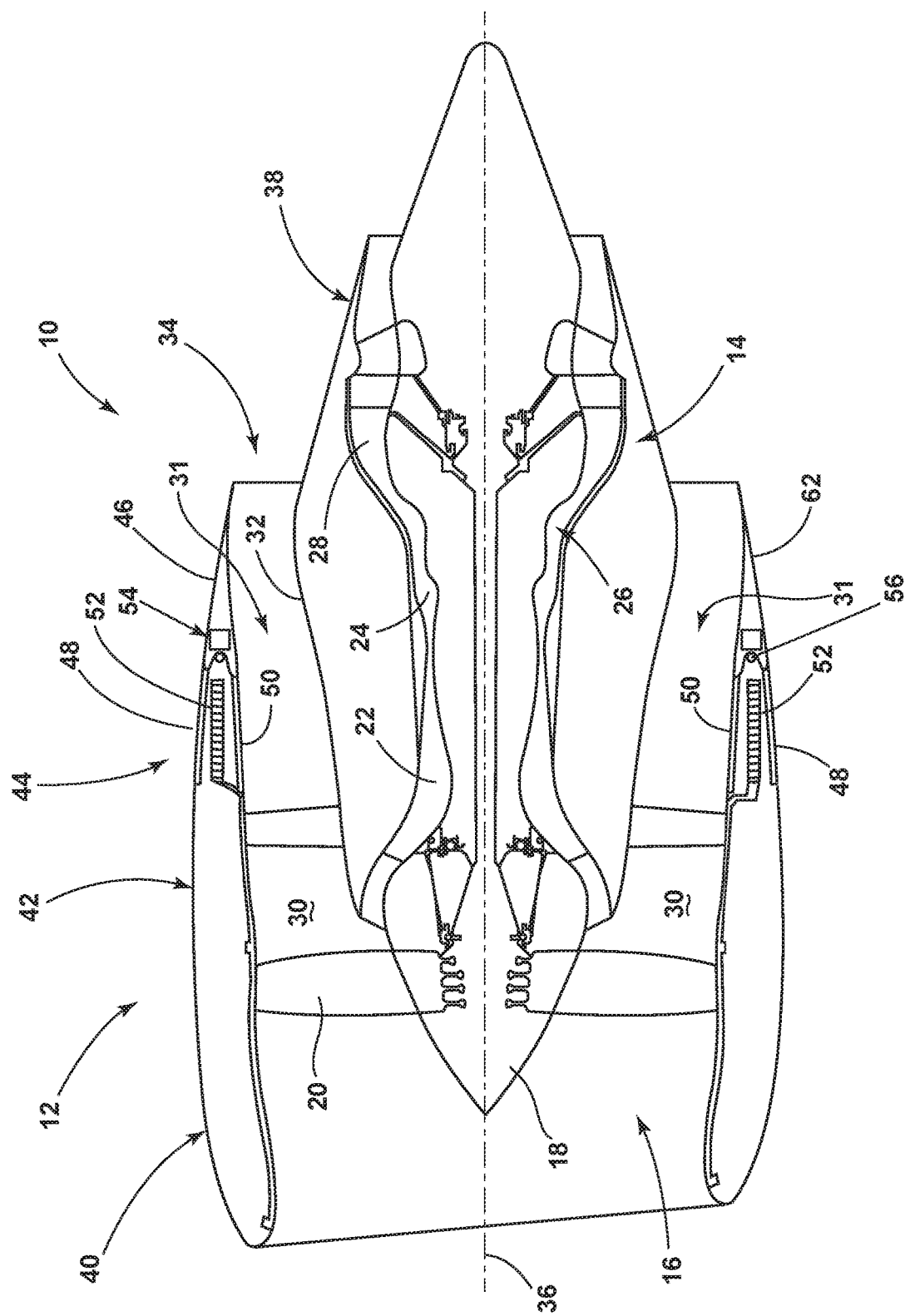
FIG. 1 is a schematic cross-sectional diagram of a gas turbine engine for an aircraft including a thrust reverser assembly in a first position.

The described aspects of the present disclosure are directed to a thrust reverser assembly, particularly in a gas turbine engine. For purposes of illustration, the present disclosure will be described with respect to an aircraft gas turbine engine. It will be understood, however, that the present disclosure is not so limited and can have general applicability in non-aircraft applications, such as other mobile applications.

Traditional thrust reversers for medium to large turbofan engines utilize a translating cowl/cascade design in which the translating cowl is pushed axially aft to expose the cascades. A series of blocker doors are rotated by this action to block the fan duct and re-direct flow through the cascades, turning the flow forward to provide reverse thrust.

Alternatively, a smaller number of thrust reversers can utilize a pivoting door configuration where large external doors are pivoted into the external flow acting as a brake and the aft end of the door pivots into the fan duct, blocking and re-directing the fan flow based on the shape and angle of the door.

The rotary actuation thrust reverser disclosed herein eliminates the aft movement of the translating cowl and uses rotary actuators to move two separate sets of doors. The translating cowl becomes a fixed cowl panel. The first set of doors, is rotated out into the external flow while the second set rotates independently down to block the fan duct flow.

The re-direction of the fan flow may be achieved using only the angle and shape of the internal and external doors, or may be combined with cascades that are shorter and simpler than those used in a traditional cascade reverser.

Higher bypass turbofan engines with larger fan diameters would typically result in larger diameter, longer nacelles with the associated penalties of increased drag, reduced ground clearance, increased aerodynamic interference with wing and high lift devices and increased weight & cost.

Short nacelles for high bypass turbofan applications are very limited in packaging space, and ball screw or linear actuators used in conventional translating thrust reversers exacerbate this problem by locating actuation system components on the front side of a thrust reverser torque box, impinging into the space available under a fan cowl. This problem is further complicated in the case of translating cascade designs, as the cascades are stowed in the fan cowl space and must be moved aft along with the translating cowl for thrust reverser deployment. By eliminating the long actuators necessary for linear translation of a conventional translating cowl, significant space becomes available under the fan cowl for accessory mounting.

In order to preserve all of the benefits of the larger bypass turbofan the engineering challenge is to create a shorter more slim line nacelle while preserving the acoustic and aerodynamic contributions of a thrust reverser. The rotary actuation system thrust reverser facilitates a shorter nacelle by eliminating axial translation of the outer cowl and the required engaged length of that cowl in its translated aft position. In addition, achieving the required reverse thrust by a combination of external doors with, optionally, a shorter cascade also provides the benefit of reduced length. Integrated design of the inner & outer doors, rotary actuator mounting structure and simpler cascades with an eliminated axially translating actuation system may also result in a smaller required packaging envelope that facilitates a slimmer nacelle.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline.

Additionally, as used herein, the terms "radial" or "radially" refer to a dimension extending between a center longitudinal axis of the engine and an outer engine circumference.

It should be further understood that "a set" can include any number of the respectively described elements, including only one element.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 schematically represents a gas turbine engine 10 including a nacelle 12 surrounding at least a portion of a core engine 14. The engine 10 has a generally longitudinal extending axis or centerline 36 extending forward to aft. A fan assembly 16 located in front of the core engine 14 includes a spinner nose 18 projecting forwardly from an array of fan blades 20. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate engine thrust. The bypassed air passes through an annular-shaped bypass duct 30 defining a fore-to-aft airflow conduit 31 between the nacelle 12 and an inner core cowl 32, and exits the bypass duct 30 through a fan exit nozzle 34. The inner core cowl 32 defines the radially inward boundary of the bypass duct 30, and provides a transition surface to a primary exhaust nozzle 38 that extends aft from the core engine 14. The nacelle 12 defines the radially outward boundary of the bypass duct 30. The bypassed fan airflows through the fore-to-aft airflow conduit 31 before being exhausted through the fan exit nozzle 34.

The nacelle 12 can include three primary elements that define the external boundaries of the nacelle 12: an inlet assembly 40, a fan cowl 42 interfacing with an engine fan case that surrounds the fan blades 20, and a thrust reverser assembly 44 located aft of the fan cowl 42. The thrust reverser assembly 44 includes three primary components: outer doors 48 mounted to the nacelle 12 and adapted to extend outwards from stowed positions shown in FIG. 1, a cascade element 52 schematically represented within the nacelle 12, and multiple blocker doors 50 adapted to be pivotally deployed (FIG. 3) from a stowed position, shown in FIG. 1, where the blocker door 50 is radially inward from the cascade element 52.

The cascade element 52 is a fixed structure of the nacelle 12, whereas the outer door 48 and the blocker door 50 are adapted to be moveable and are coupled to a rotary actuator assembly 54 capable of producing rotary motion or transferring torque to a lever arm 57 coupled to the outer and blocker doors 48, 50. When pivoted into the air duct 30, a fore end 59 of the blocker door 50 remains adjacent to or spaced from the inner cowl 32.

While two outer doors 48 and blocker doors 50 are shown in FIG. 1, a set of outer doors 48 are typically circumferentially spaced around the nacelle 12 and a set of blocker doors 50 are radially spaced about the core engine 14.

In traditional thrust reverser assemblies, a translating cowl portion is included and it translates aft to expose any included cascade elements. Conversely, in the present disclosure, a fixed outer cowl portion 46 is included in the nacelle. The fixed outer cowl portion 46 is aft of the outer door 48 and the blocker door 50. In this manner, the fixed outer cowl portion 46 can be considered integrated with the remainder of the nacelle 12. The fixed outer cowl portion 46 can also provide housing for the rotary actuator assembly 54.

Figure 2:
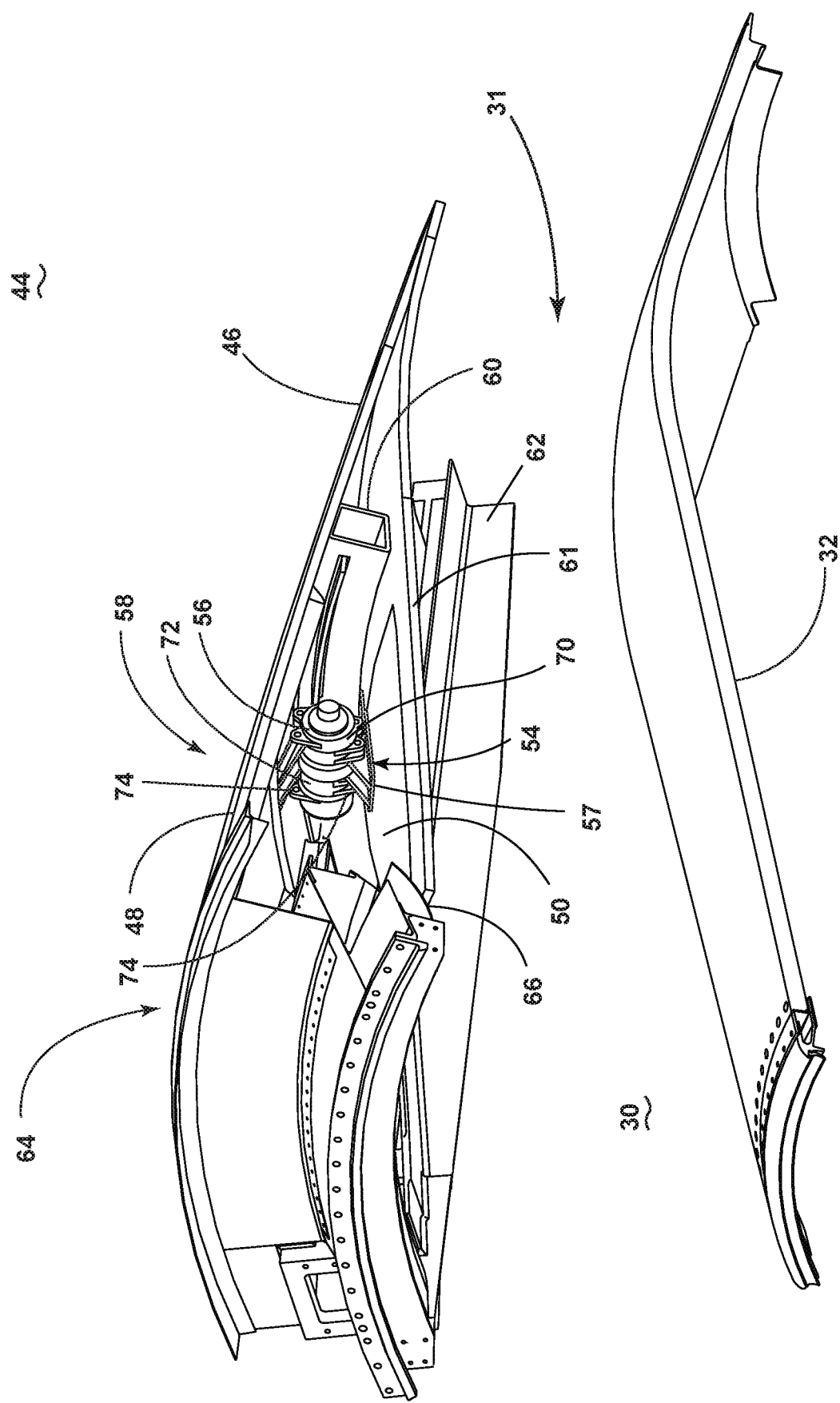
FIG. 2 is a perspective view of the thrust reverser assembly from FIG. 1 in a stowed position.

FIG. 2 illustrates a perspective view of a portion of the thrust reverser assembly 44 in which the outer and blocker doors 48, 50 are in a stowed position 58. The cascade element has been removed for illustrative purposes to allow a clearer view of the rotary actuator assembly 54 including a rotary actuator 56 which can be multiple rotary actuators 56. The rotary actuator 56 is housed within the fixed outer cowl portion 46, which can include sections 61 extending forward creating a frame encompassing the blocker door 50 when in the stowed position 58.

A fore-aft beam 62 formed from a suitable structural material including, but not limited to steel or aluminum or composite, can couple the outer cowl portion 46 to the fan cowl 42. The fore-aft beam 62 provides structural support for an arcuate structural frame 60 and for a terminal end 64 of the thrust reverser assembly 44. When fully assembled, a plurality of fore-aft beams 62 circumscribe the inner core cowl 32.

The arcuate structural frame 60 can be housed within the outer cowl portion 46 to provide a mounting platform for the rotary actuator 56. The frame 60 also provides structural integrity for the thrust reverser assembly 44 wherein when in use, forces applied to the outer and blocker doors 48, 50 can be dissipated or transferred to the arcuate structural frame 60.

The terminal end 64 forms a seal between the fan cowl 42 and the thrust reverser assembly 44. The terminal end 64 comprises multiple structural parts which together or separately form an annular structure. A portion of the terminal end 64 can be formed to provide a sealing surface 66 for the blocker doors 50. The sealing surface 66 can be arcuate and formed from a lightweight steel. The arcuate form provided on the sealing surface 66 provides for a smooth seal between the blocker door 50 and the sealing surface 66.

The rotary actuator 56 can be a planetary rotary actuator having a plurality of fixed ring gears 70 and moveable output ring gears 72 each integrated with attachment lugs 74, where the attachment lugs 74 formed on the moveable output ring gears 72 are further coupled to the lever arms 57. When a signal is received rotating of the moveable output gears enables the outer and blocker doors 48, 50 to rotate from a stowed position to a deployed position. While illustrated as a compound planetary rotary actuator, the rotary actuator 56 can be for example, but not limited to, an individual, slave, hydraulic, or electric rotary actuator, or any other rotary actuator known in the art. The rotary actuator 56 can also include individual gearboxes that are powered and synchronized mechanically or electrically and allow the independent movement of the blocker and outer doors.

Figure 3:
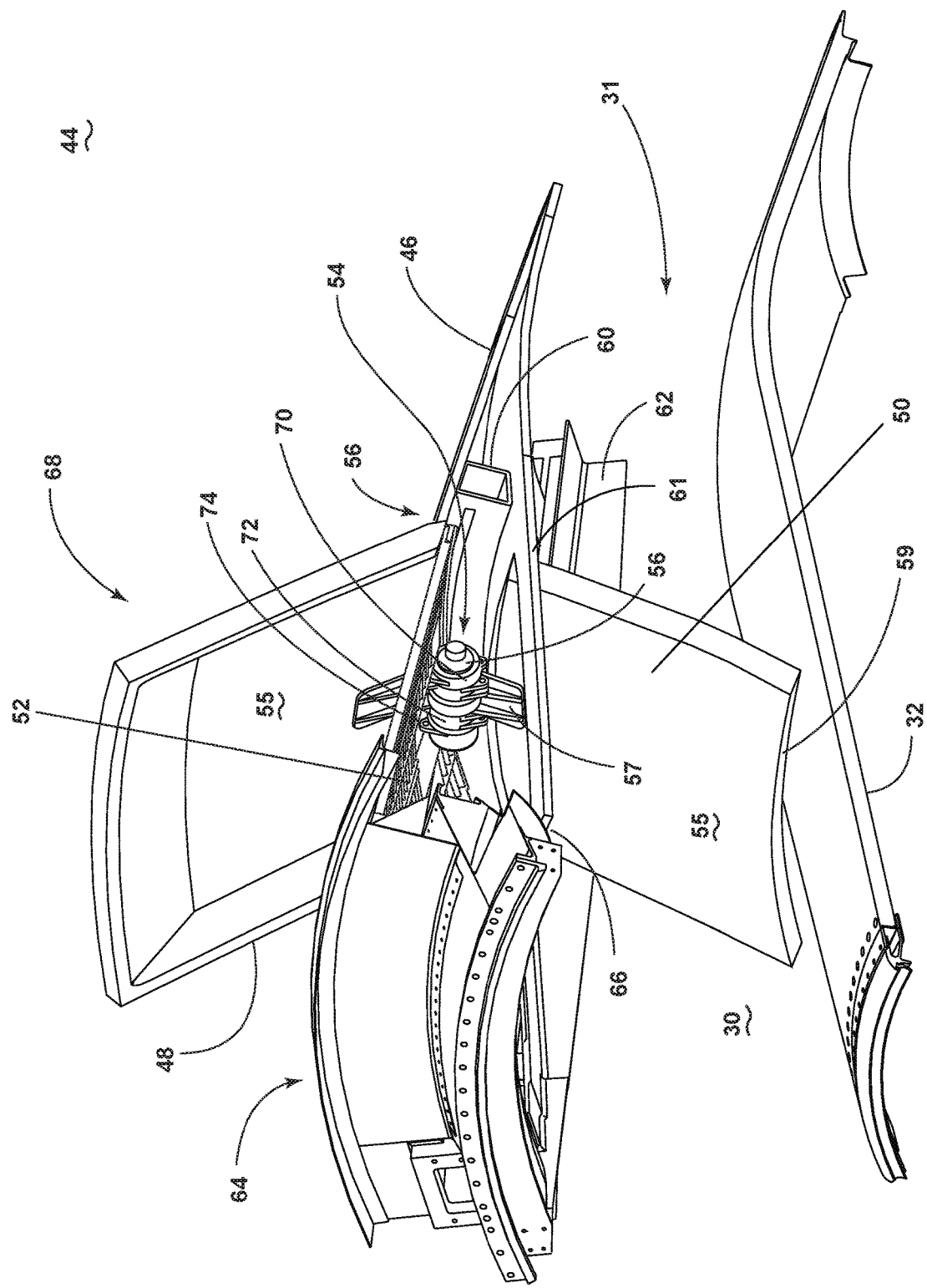
FIG. 3 is a perspective view of the thrust reverser assembly from FIG. 1 in a deployed position.

FIG. 3 is similar to the perspective view of FIG. 2 but with the outer and blocker doors 48, 50 in a deployed position 68 and with the cascade element 52 illustrated. When a signal from a controller is received the rotary actuator assembly 54 causes the rotary actuator 56 to selectively move the lever arms 57. Each lever arm 57 can be separately mounted to an inside portion 55 of the outer and blocker doors 48, 50 keeping the bypass duct 30 and outside surface of the outer cowl 46 free of any air gaps or holes during operation. The outer door 48 moves outwards from the nacelle and the blocker door 50 moves into the bypass duct 30. When fully deployed the blocker door 50 comes to rest at an angle less than 90° to its stowed position 58 adjacent the inner core cowl 32. It can be further contemplated that stops (not shown) can be mounted to the inner core cowl 32 for supporting adjacent to or in engagement with the fore end 59 of the blocker door 50 in a fully deployed state.

The outer and blocker doors 48, 50 are illustrated as a pair coupled to each other by the rotary actuator assembly 54. It should be understood that these pairs together circumscribe the engine core 14.

By allowing independent movement the doors may be optimally timed to address area match between the fan duct exhaust nozzle and the reverse thrust open area. Further, independent opening of the doors allows individual optimization of the door opening angles and reverse thrust performance.

Alternatively, the cascade element 52 can be integrated with the necessary strength and stiffness to provide the structural support, which is currently provided by the fore-aft beam 62, to the arcuate structural frame 60 and terminal end 64. This reallocating of support can provide the thrust reverser assembly 44 with more room and less parts.

Figure 4:
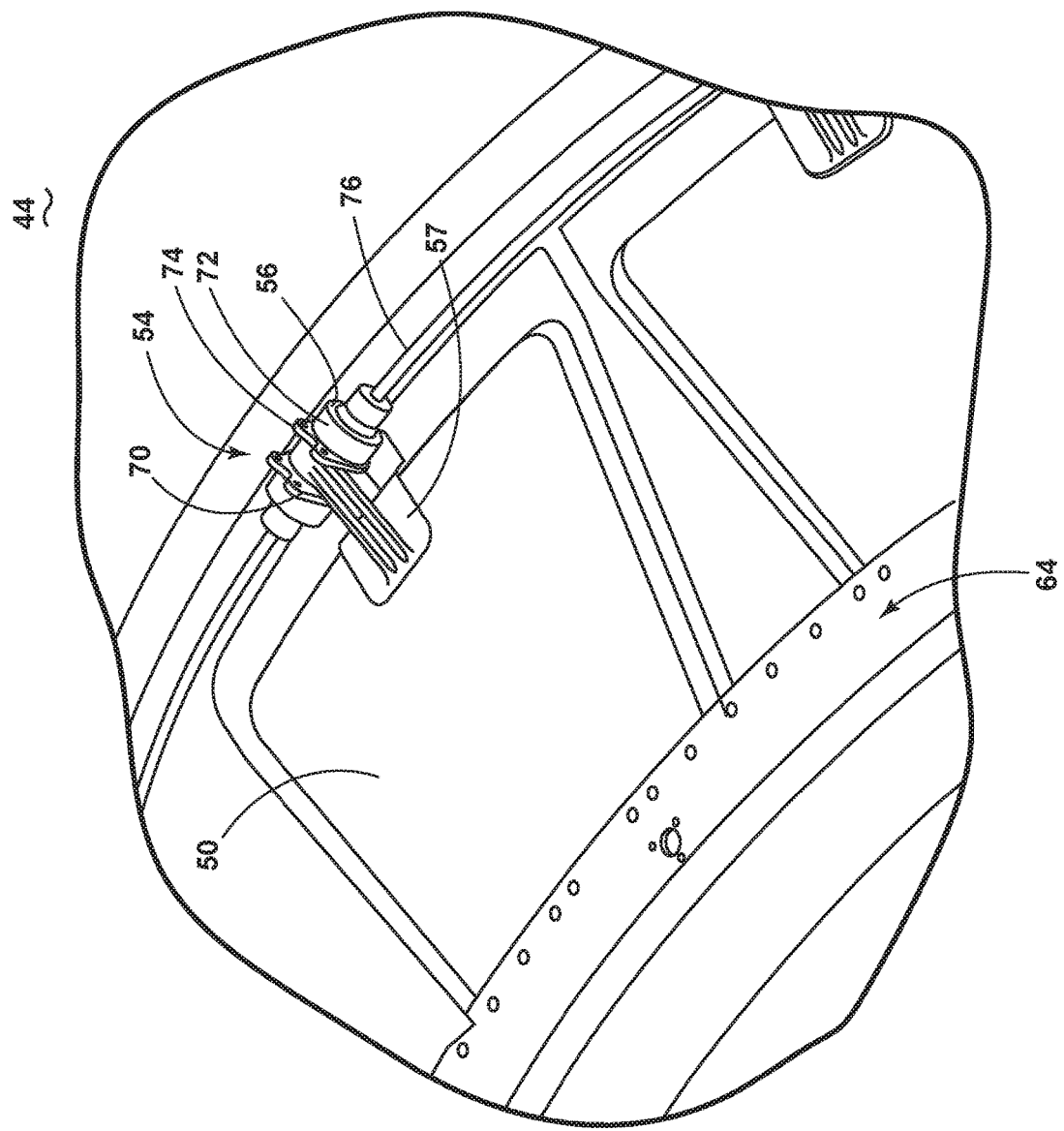
FIG. 4 is a perspective view of a blocker door for the thrust reverser assembly of FIG. 3.

FIG. 4 is an additional perspective view looking radially inward toward the blocker door 50 in the stowed position 58. A flex shaft 76 can extend through the rotary actuator 56 to connect multiple actuators of proximate outer and blocker door 48, 50 pairs. An lever arm 57 operably couples the blocker door 50 to the rotary actuator 56 such that the rotary motion of the rotary actuator 56 is translated to move the blocker door 50 between the stowed position 58 and the deployed position 68. Multiple rotary assemblies connected by the flex shaft 76 can be powered by a single motor or can each be powered individually and synchronized mechanically or electrically to deploy simultaneously. It will be further understood that both the rotary actuator 56 can be pneumatic, hydraulic or electrically driven. The electrically driven approach can include reduced system complexity and increased controllability.

Figure 5:
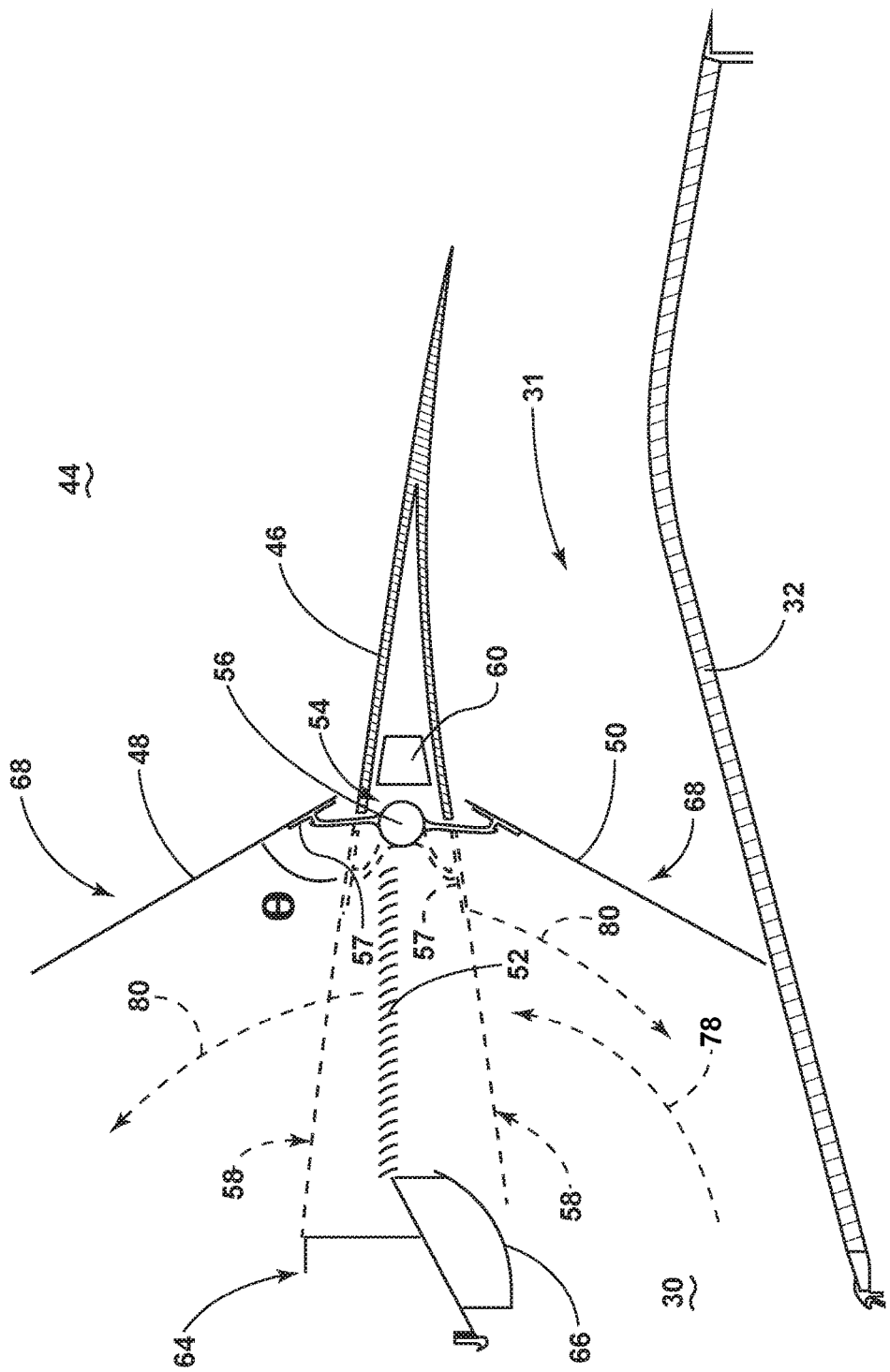
FIG. 5 is a schematic cross-sectional view of the thrust reverser assembly of FIG. 1.

FIG. 5 depicts a close-up schematic view of the thrust reverser assembly 44 with the outer door 48 and blocker door 50 moved from the stowed position 58 (shown in phantom) to the deployed position 68.

The rotary actuator 56 can be configured to selectively move the lever arms 57 coupled to both the outer door 48 and the blocker door 50 between the stowed position 58 and the deployed position 68 to an angle θ which can be between 25 and 60 degrees. The deployed position 68 exposes the cascade element 52 so that the outer door 48 projection acts as an air brake causing an increase in drag or force acting opposite the relative motion of the engine 10.

The rotary actuator 56 can also selectively move the blocker door 50 from the stowed position 58 to the deployed position 68, where it comes to rest adjacent to the inner core cowl 32 to decrease stress produced by fan duct airflow 78. In a fully deployed position 68, the blocker door 50 substantially blocks the fan duct airflow 78 from passing through the airflow conduit 31 and deflects the airflow 78 outwards. Air within the bypass duct 30 is redirected towards the exposed cascade element 52 providing a thrust reversal effect by redirecting the fan duct airflow 78 within the bypass duct 30 to exit out and forward through the cascade element 52 becoming a reverse thrust flow 80. Redirecting the bypassed air into a forward direction produces a force in the opposite direction of travel to ensure deceleration. The sealing surface 66 can act as a flow web to aid in directing fan duct airflow through the cascade element 52. It is contemplated that the movement of the outer door 48 and the blocker door 50 can be done simultaneously or sequentially.

During operation, when the outer door 48 and the blocker door 50 have been moved to the deployed positions, respectively, the fan duct airflow 78 presses against the blocker door 50 with a force, creating a load determined by the airflow pressure and the surface area of the blocker door 50. The load can be transferred from the blocker door 50 to the rotary actuator 56 and then to the structural frame 60, or the cascade element 52 as the case may be. The outer cowl portion 46 can receive some of the transferred load as well. Additionally, the load can be shared by the inner core cowl 32 and the core engine 14, better adapted to bear the load. Thus, the load created by the force of the fan duct airflow 78 on the rotary actuator 56 can be reduced.

The controller module (not shown) can be operably coupled to the thrust reverser assembly 44 to control its operation. The controller can receive a signal from a user, for example a pilot of an aircraft, when thrust reverser force is necessary to slow or brake the aircraft and a second signal when thrust reverser forces are no longer necessary. The signal can be sent to the rotary actuator 56. As described herein, the movement of the rotary actuator assembly 54 can be programmed to move the outer and blocker doors 48, 50 simultaneously or independent of each other. It will be understood that the controller module can include one or more processors to operate the movement of the thrust reverser assembly 44.

Benefits to implementing a rotary actuator assembly include an efficient packaging of a system that can replace a conventional linearly translated thrust reverser. Space required for linear actuation system used in translating the cowl in an aft direction is no longer necessary, allowing for additional space within the outer cowl for mounting the accessories necessary for implementing the rotary actuator assembly. In addition, the need for slider, slider track and cowl guide components on the translating cowl and hinge/latch beams will be eliminated providing a complexity, part count and weight reduction. Smaller hinge and latch beams will also allow improved fan duct aero lines with associated aerodynamic drag reductions.

Accessories for mounting the rotary actuator assembly require less space than the conventional linearly translated thrust reverser allowing for better fan duct aerolines. Additionally, smaller hinge and latch beam parts provide for weight reduction.

It should be appreciated that the operation of the blocker doors 50 and their guided and rotating connections are not dependent on any particular type of cascade design, and in fact the present disclosure could be installed in a non-cascade reverser design in which the bypassed air is diverted from the bypass duct through openings of various configurations. Furthermore, whereas the blocker door 50 is shown with a rigid construction that does not intentionally bend, flex or fold during its deployment, blocker doors having any of these capabilities are also within the scope of the present disclosure. It should be further understood that an extended length blocker door or folding door that extends as it is deployed can be utilized to provide an outer door 48 that, when deployed, is capable of extending into the external airflow to provide additional retarding drag Finally, it should also be appreciated that the thrust reverser assembly 44 and its individual components can be constructed of various materials, including metallic, plastic and composite materials commonly used in aerospace applications and fabricated by machining, casting, molding, lamination, etc., and combinations thereof.

In any of the above various aspects, a protective coating, such as a thermal barrier coating, or multi-layer protective coating system can be applied to the cowls or engine components. The various aspects of systems, methods, and other devices related to the present disclosure disclosed herein provide an improved thrust reverser assembly, particularly in regard to packaging engine systems under a fan cowl.

The rotary actuation system is anticipated to yield improved packaging within a smaller space envelope. This in combination with a non-deploying outer cowl will result in a shorter nacelle and also help to facilitate a slimmer nacelle with a reduced outer diameter. The aerodynamic drag and overall weight will be reduced and the acoustic performance should be maintained.

These combined benefits will be manifested as reduced specific fuel consumption or improved engine performance versus a conventional thrust reverser. In addition, the ready availability of electrically powered rotary actuators may also assist in facilitating the "More Electric" aircraft.

It is assumed that the cascades may be designed to be both simpler and shorter than conventional cascades due to the increased reverse thrust and aerodynamic drag caused by the outer doors.

The traditional thrust reverser forward torque box would be significantly reduced in complexity and weight, primarily becoming an aerodynamic fairing to guide re-directed fan flow. The translating cowl would no longer slide aft in operation—significantly reducing the complexity and weight of both the cowl and the reverser beams which no longer provide the slider tracks.

An additional use for the thrust reverser system described herein could be for a reversible pitch fan installation, allowing air to be re-directed from outside of the nacelle towards the fan as the fan is operating in a reverse pitch mode in order to provide reverse thrust.

This written description uses examples to disclose the present disclosure, including the best mode, and to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine, comprising:
   a core engine;
   a nacelle surrounding at least a portion of the core engine;
   a bypass duct defined by and between the nacelle and the core engine and defining a fore-to-aft airflow conduit;
   an outer door movable between a stowed position and a deployed position, where the outer door extends outwards from the nacelle;
   a blocker door extending between a fore end and an aft end and movable between a stowed position and a deployed position, where the blocker door extends into the airflow conduit to deflect airflow outwards; and
   a rotary actuator assembly located aft of the fore end of the blocker door and rotatable about a hinge point having an axis extending in a circumferential direction with respect to the core engine, operably coupled to the outer door and transferring a torque to the outer door to rotate the outer door about the hinge point between the stowed and the deployed positions and operably coupled to the blocker door and transferring a torque to the blocker door to rotate the blocker door about the hinge point between the stowed and the deployed positions.

2. The gas turbine engine of claim 1, further comprising a cascade element located within the nacelle.

3. The gas turbine engine of claim 2 wherein the blocker door is located radially inward from the cascade element.

4. The gas turbine engine of claim 1 wherein the nacelle comprises an outer cowl portion aft of the blocker doors and wherein the outer cowl portion is fixed.

5. The gas turbine engine of claim 4 wherein the rotary actuator assembly is mounted within at least a portion of the outer cowl portion.

6. The gas turbine engine of claim 1 wherein the outer door in the deployed position is at an angle between 25 degrees and 60 degrees from the nacelle to act as an air brake.

7. The gas turbine engine of claim 1 wherein the outer door redirects the airflow causing the airflow to exit out and forward.

8. The gas turbine engine of claim 1 wherein the rotary actuator assembly comprises multiple rotary actuators that are individually powered and synchronized mechanically or electrically.

9. The gas turbine engine of claim 1 wherein the rotary actuator assembly comprises multiple rotary actuators that are powered with a single motor.

10. The gas turbine engine of claim 1, wherein the outer door is one of multiple outer doors circumferentially spaced about the nacelle.

11. The gas turbine engine of claim 10, wherein the blocker door is one of multiple blocker doors and wherein the multiple outer doors and the multiple blocker doors are paired about the gas turbine engine.

12. A thrust reverser assembly for a gas turbine engine including a core engine, a nacelle surrounding at least a portion of the core engine to define a bypass duct between the nacelle and the core engine, the thrust reverser assembly comprising:
   an outer door movable between a stowed position and a deployed position, where the outer door extends outwards from the nacelle;
   a blocker door extending between a fore end and an aft end and movable between a stowed position and a deployed position, where the blocker door extends into an airflow conduit defined by the bypass duct to deflect air outwards; and
   a rotary actuator assembly located aft of the fore end of the blocker door and rotatable about a hinge point having an axis extending in a circumferential direction with respect to the core engine, operably coupled to the outer door and transferring a torque to the outer door to rotate the outer door about the hinge point between the stowed and the deployed positions and operably coupled to the blocker door and transferring a torque to the blocker door to rotate the blocker door about the hinge point between the stowed and the deployed positions.

13. The thrust reverser assembly of claim 12, further comprising a cascade element located within the nacelle.

14. The thrust reverser assembly of claim 13 wherein the blocker door, in the stowed position, is located radially inward from the cascade element and the outer door, in the stowed position, is located radially outward from the cascade element.

15. The thrust reverser assembly of claim 12 wherein the nacelle comprises an outer cowl portion aft of the blocker door and wherein the outer cowl portion is fixed.

16. The thrust reverser assembly of claim 12 wherein the rotary actuator assembly comprises multiple rotary actuators that are individually powered and synchronized mechanically or electrically.

17. The thrust reverser assembly of claim 12, wherein the blocker door is one of multiple blocker doors circumferentially spaced about the core engine and the outer door is one of multiple outer doors circumferentially spaced about the nacelle.

18. A method of operating a thrust reverser system for an aircraft, the thrust reverser system including an outer door and a blocker door, the method comprising:
   deploying, by a rotary actuator rotatable at a hinge point about an axis extending in a circumferential direction with respect to a core engine of the aircraft and located aft of a fore end of the blocker door, the outer door from a stowed position to a deployed position, where the rotary actuator transfers a torque to rotate the outer door at the hinge point outwards from a nacelle of a gas turbine engine of the aircraft; and
   deploying, by the rotary actuator, the blocker door from a stowed position to a deployed position, where the rotary actuator transfers a torque to rotate the blocker door at the hinge point into an airflow conduit defined by a bypass duct defined by and between the nacelle and the core engine;
   wherein the blocker door and the outer door redirect fan duct airflow causing the airflow to exit out and forward as guided by the deployed outer door.

19. The method of claim 18 wherein deploying the blocker door deflects air through a cascade element.

20. The method of claim 18 wherein deploying the outer door and deploying the blocker door occurs simultaneously.

* * * * *